US 6,546,593 B2

(12) United States Patent
Oh et al.

(10) Patent No.: US 6,546,593 B2
(45) Date of Patent: Apr. 15, 2003

(54) UPRIGHT TYPE VACUUM CLEANER HAVING A CYCLONE TYPE DUST COLLECTOR

(75) Inventors: Jang-Keun Oh, Kwangju (KR); Kyu-Chang Park, Kwangju (KR); Jeong-Gon Song, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 09/781,072

(22) Filed: Feb. 8, 2001

(65) Prior Publication Data

US 2001/0042283 A1 Nov. 22, 2001

(30) Foreign Application Priority Data

May 16, 2000 (KR) .......................................... 2000-25942
May 16, 2000 (KR) .......................................... 2000-25943

(51) Int. Cl.⁷ ................................................ A47L 9/16
(52) U.S. Cl. ........................ 15/353; 55/429; 55/459.1; 55/DIG. 3
(58) Field of Search .......................... 15/353, 350, 351; 55/429, 459.1, DIG. 3

(56) References Cited

U.S. PATENT DOCUMENTS

| 4,853,008 A | * | 8/1989 | Dyson ........................ 15/353 |
| 5,145,499 A | * | 9/1992 | Dyson ........................ 15/352 |
| 5,267,371 A | * | 12/1993 | Soler et al. ................ 15/327.5 |
| 6,026,540 A | | 2/2000 | Wright et al. |
| 6,428,589 B1 | * | 8/2002 | Bair et al. ...................... 15/353 |

FOREIGN PATENT DOCUMENTS

| EP | 0 042 723 A2 | 12/1981 | ............. A47L/9/16 |
| EP | 0 636 338 A2 | 2/1995 | ............. A47L/9/16 |
| EP | 0 728 435 A1 | 8/1996 | ............. A47L/9/16 |
| EP | 0636338 | 6/1997 | |
| EP | 0 923 992 A2 | 6/1999 | ............. B04C/5/04 |

OTHER PUBLICATIONS

Combined Search and Examination Report issued May 8, 2001 by the British Patent Office with respect to corresponding British Patent Application No. 0103042.8.

* cited by examiner

Primary Examiner—Terrence R. Till
(74) Attorney, Agent, or Firm—Ladas & Parry (57) ABSTRACT

An upright type vacuum cleaner has a cyclone type dust collector removably disposed therein. The cyclone type dust collector separates by centrifugal force and collects various contaminants from the air that is drawn into the cleaner body. The cyclone type dust collector includes an upper cover, inner and outer cyclone receptacles, and a lower cover. The air, along with minute dust and large particle contaminants, is drawn into the dust collector and induced into a vortex, whereby the dust and contaminants are separated by centrifugal force and collected. The clear air is discharged to an outside atmosphere through an outlet pipe in the upper cover. The dust collector may be removed from the cleaner body and the lower cover opened to dispose of contaminants collected therein.

13 Claims, 8 Drawing Sheets

UPRIGHT TYPE VACUUM CLEANER HAVING A CYCLONE TYPE DUST COLLECTOR

BACKGROUND OF THE INVENTION

1. Field of the Invention

The present invention relates to an upright type vacuum cleaner, and more particularly, to an upright type vacuum cleaner having a cyclone type dust collector capable of separating by centrifugal force and collecting various contaminants from the air that is drawn into the vacuum cleaner through a suction brush, thereby providing more economical vacuum cleaner by eliminating the need for a dust filter.

2. Description of the Related Art

Generally, an upright type vacuum cleaner includes a suction brush, which is formed at an end of the vacuum cleaner body and moves along a cleaning surface. The vacuum cleaner body includes an inner space that is divided into a dust chamber and a motor driving chamber. A dust filter is removably disposed in the dust chamber, and a motor is disposed in the motor chamber.

When the motor operates, a strong suction force is generated at the suction brush, and dust and other contaminants on the cleaning surface are drawn into the vacuum cleaner body together with ambient air. After being drawn in, the air is discharged from the cleaner body via the dust filter in the dust chamber. Accordingly, contaminants are filtered out by the dust filter, while the clear air is discharged from the cleaner body via the motor chamber.

Such a general upright type vacuum cleaner, however, requires a dust filter and a dust chamber, in which contaminants are removed from the air by the dust filter. The dust filter is an expendable item that a user has to separately prepare for future use. Further, when the dust filter is clogged with contaminants, the user must manually replace the dust filter. Manual replacement of a dirty dust filter is both inconvenient and unhygienic.

SUMMARY OF THE INVENTION

The present invention has been made to overcome the above-mentioned problems of conventional upright type vacuum cleaners. It is an object of the present invention to provide an upright type vacuum cleaner having a cyclone type dust collector for semi-permanent use. The cyclone type dust collector is capable of separating by centrifugal force and collecting contaminants from the air that is drawn in through the suction brush. The dust collector can be removed from the vacuum cleaner body and reinserted after the contaminants collected therein have been emptied out.

Another object of the present invention is to provide an upright type vacuum cleaner capable of allowing easy disposal of the contaminants collected therein.

In order to accomplish the above objects of the present invention, an upright type vacuum cleaner includes a cyclone type dust collector removably disposed in the vacuum cleaner. Via centrifugal force, the dust collector separates and collects dust and other contaminants from the air that is drawn in through a suction brush into a dust chamber in the vacuum cleaner.

The cyclone type dust collector of the present invention includes an upper cover, an outer cyclone receptacle coupled to the upper cover, an inner cyclone receptacle also coupled to the upper cover, and a lower cover. The upper cover has a first air inlet, corresponding to a suction hose for connecting the suction brush and the dust chamber, and an air outlet, corresponding to an exhaust hose for connecting the dust chamber and a motor chamber. The outer cyclone receptacle, which is substantially cylindrical, has open upper and lower ends. The inner cyclone receptacle is disposed in the outer cyclone receptacle. The lower cover is removably mounted on a lower opening of the outer cyclone receptacle to allow disposal of dust and contaminants, which have been collected in the inner and outer cyclone receptacles.

The inner cyclone receptacle includes a grill having a plurality of fine holes formed therein, and a second air inlet for guiding the air, which ascends in a reverse direction from the bottom of the outer cyclone receptacle, through the grill and into a vortex. A centrifugal force of the vortex separates and collects the dust and contaminants from the air.

Here, it is preferable that the first and second air inlets of the upper cover partially overlap each other.

According to another preferred embodiment of the present invention, the first air inlet of the inner cyclone receptacle guides the air, containing dust and contaminants, into a vortex having a centrifugal force, by which the contaminants are separated and collected in the inner cyclone receptacle. The inner cyclone receptacle has a contaminant outlet, through which the contaminants that have been separated from the air are discharged into the outer cyclone receptacle.

The upper cover includes an outlet pipe that extends downward from the air outlet. The outlet pipe includes a first skirt that extends downward from an end. The skirt has a gradually increasing diameter for preventing contaminants collected in the inner cyclone receptacle from floating upward. In addition, the outlet pipe includes a second skirt that extends downward from a middle level of the outlet pipe. The second skirt has a gradually increasing diameter for guiding contaminants through the contaminant outlet.

Further, according to the present invention, the inner cyclone receptacle tapers downward from the middle level thereof. The downward tapering of the inner cyclone receptacle gradually increases a gap between the inner and outer cyclone receptacles and thus, decreases a flow velocity of the air and to prevent a reverse flow of contaminants that have been collected in the outer cyclone receptacle.

In addition, a reverse flow prevention pipe extends a predetermined height from the center of the inner cyclone receptacle to guide the vortex of air that ascends in a reverse direction from the bottom of the inner cyclone receptacle and to prevent a reverse flow of contaminants.

The lower cover is detachably screwed onto a lower opening of the outer cyclone receptacle, and the reverse flow prevention pipe is integrally formed on the center of the lower cover.

One side of the lower cover is hingedly connected to a lower end of the outer cyclone receptacle. On the other side of the lower cover, a locker is formed on for engaging a locking protrusion formed on the outer cyclone receptacle to secure the lower cover to the outer cyclone receptacle. The lower cover provides access to the inside of the inner and outer cyclone receptacles, facilitating disposal of contaminants collected therein. Here, the reverse flow prevention pipe is integrally formed on a lower opening of the inner cyclone receptacle by a plurality of ribs.

BRIEF DESCRIPTION OF THE DRAWINGS

The above objects and other features and advantages of the present invention will become readily apparent by reference to the following detailed description when considered in conjunction with the accompanying drawings, in which.

DETAILED DESCRIPTION OF THE PREFERRED EMBODIMENT

The preferred embodiment of the present invention will be described below with reference to the accompanying drawings.

Figure 1:
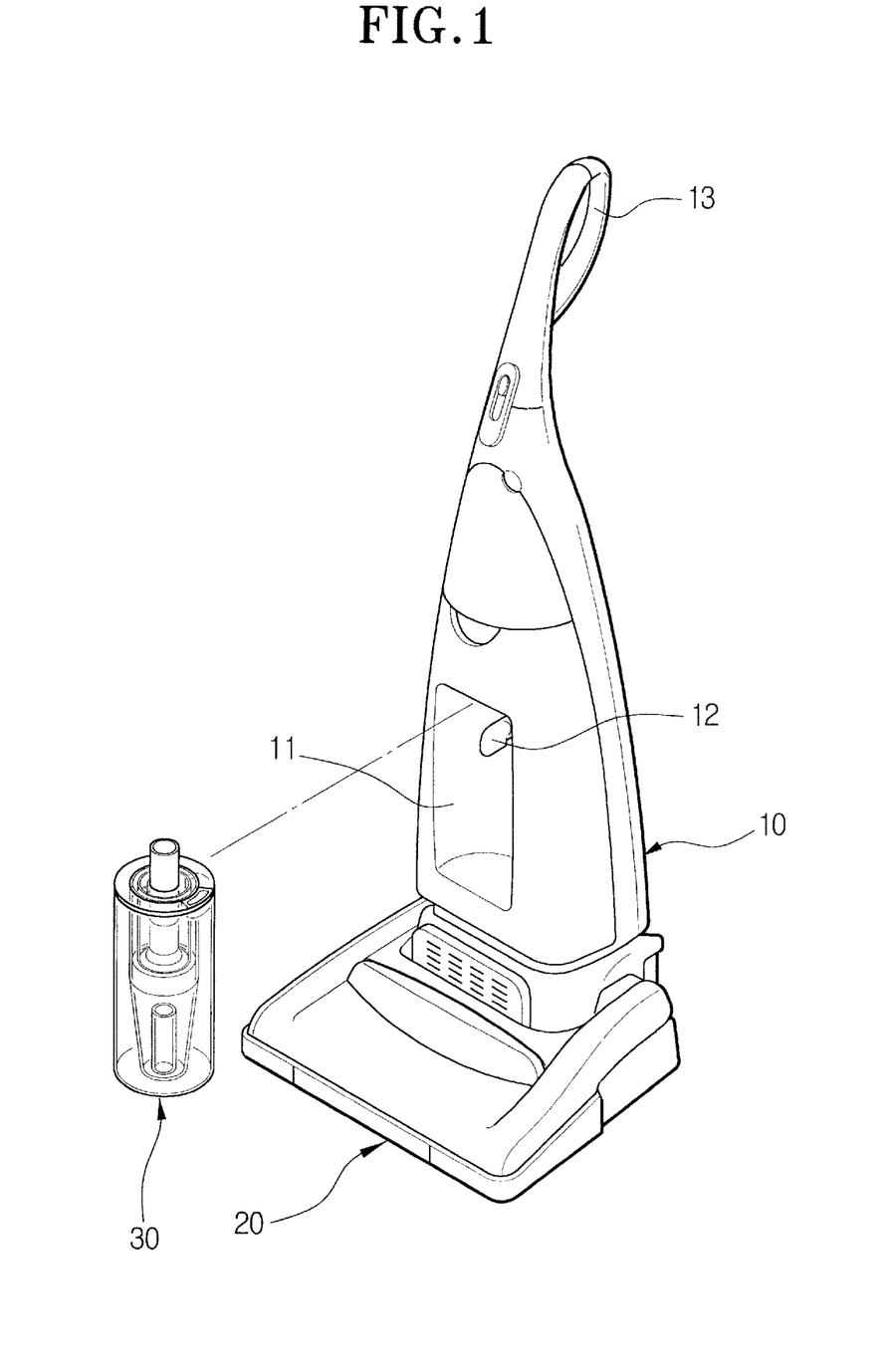
FIG. 1 is a perspective view of an upright type vacuum cleaner having a cyclone type dust collector in accordance with the present invention.

FIG. 1 is a perspective view of an upright type vacuum cleaner collector according to the present invention. The upright type vacuum cleaner of the present invention includes a body 10, a suction brush 20, and a cyclone type dust collector 30.

The body 10 has a dust chamber 11 and a motor chamber (not shown). A handle 13 is formed on an upper side of the body 10. The suction brush 20 is pivotally connected to a lower end of the body 10 and is capable of rotating a predetermined angle. Further, the cyclone type dust collector 30 is removably mounted in the dust chamber 11 of the body 10.

The dust chamber 11 has an air inlet 12 and an air outlet (not shown) formed therein. The air inlet 12 is connected to the suction brush 20 through a suction hose, while the air outlet is connected to the motor chamber through a conduit (not shown) formed in the vacuum cleaner body. After flowing through the suction brush 20, the suction hose, and the air inlet 12, the air along with the dust (minute particles) and contaminants (larger particles) flow into the dust chamber 11. The air is discharged to the outside atmosphere through the air outlet, the conduit of the cleaner body 10, and the motor chamber, while the contaminants of the air are filtered out at the cyclone type dust collector 30.

The cyclone type dust collector 30 separates dust and contaminants from the air using centrifugal force, and includes an upper cover 140, an inner cyclone receptacle 150, an outer cyclone receptacle 160, and a lower cover 170.

Figure 2:
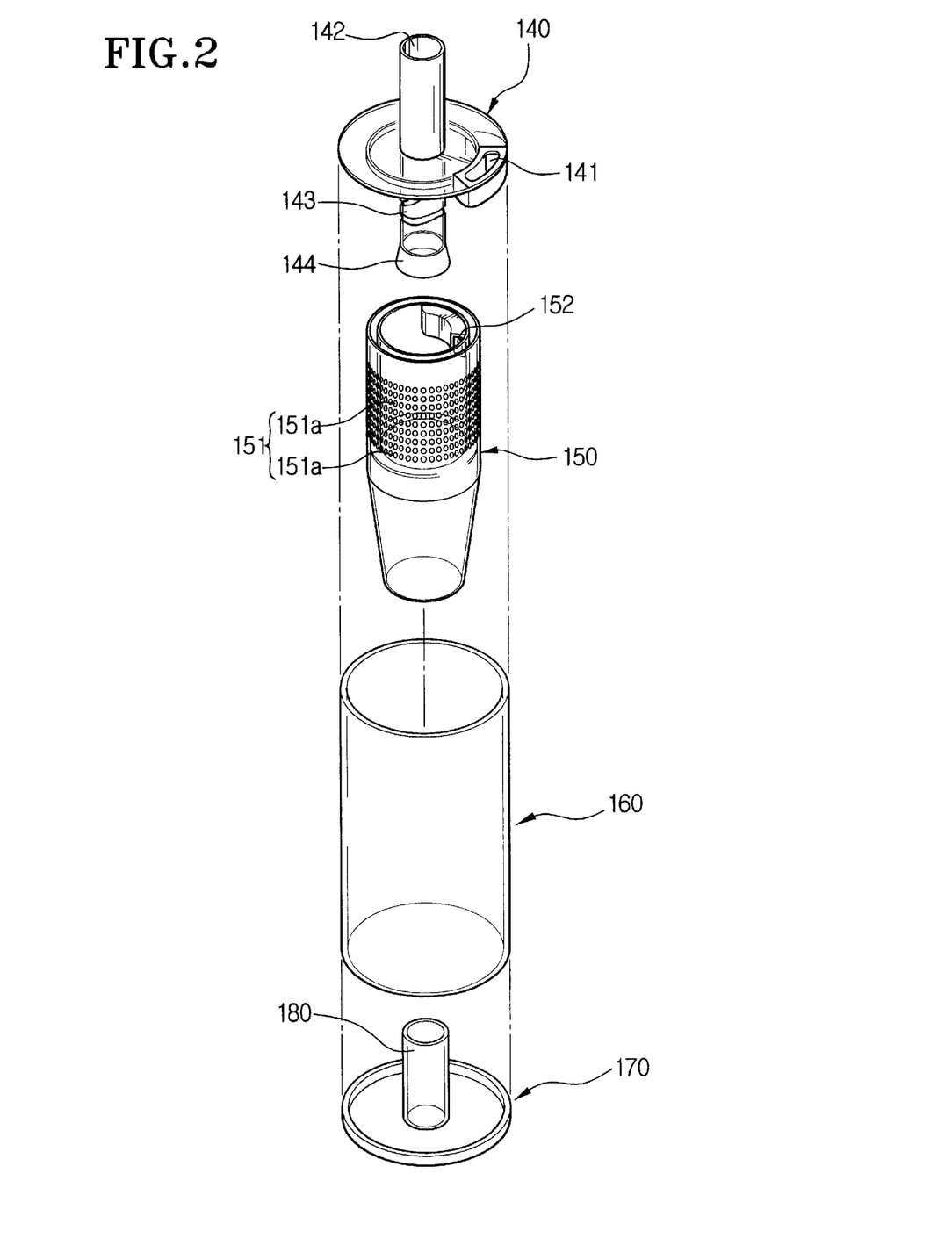
FIG. 2 is an exploded perspective view of the cyclone type dust collector according to a first preferred embodiment of the present invention.
Figure 3:
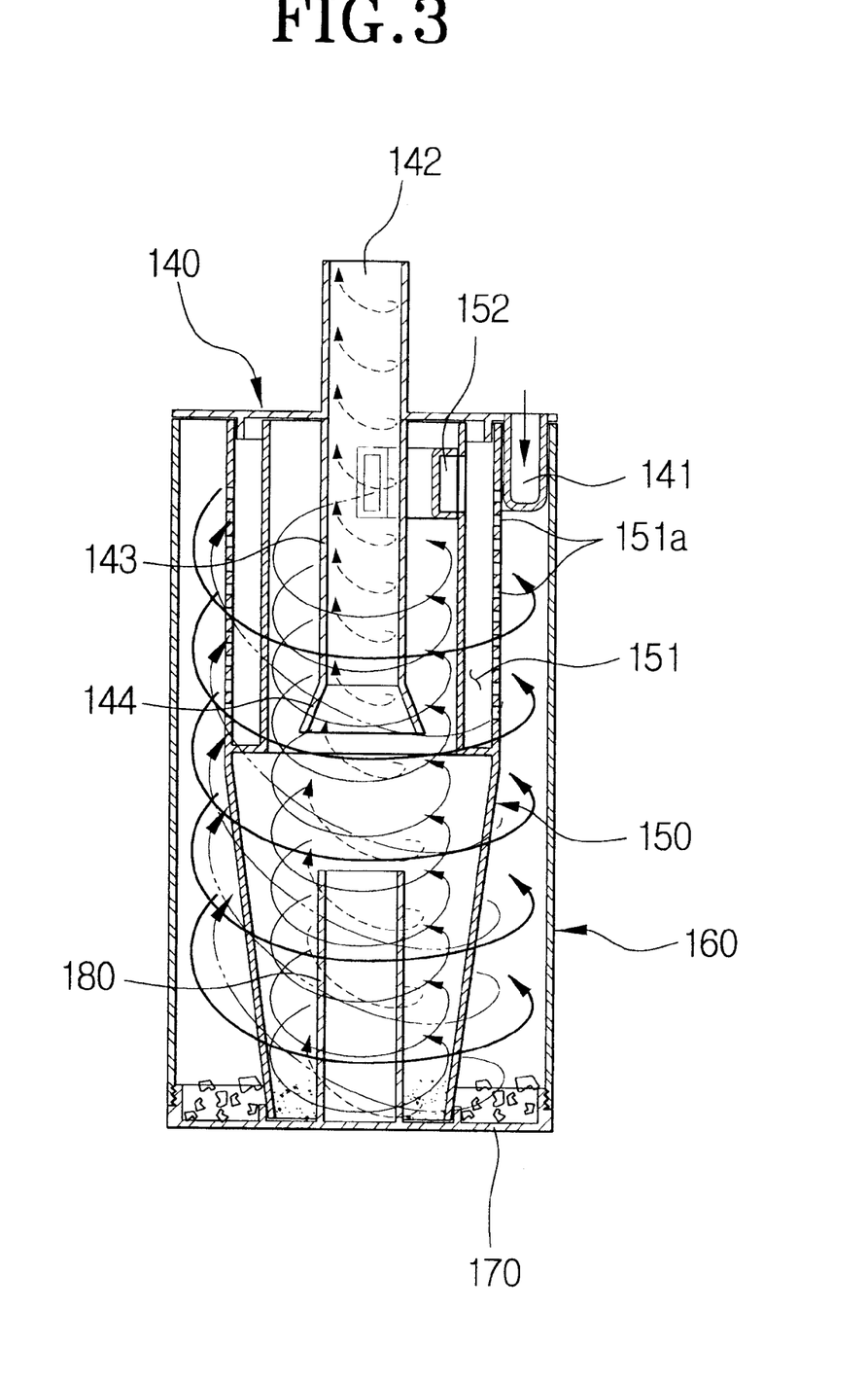
FIG. 3 is a sectional view showing the cyclone type dust collector of FIG. 2 in an assembled state.

According to the first preferred embodiment shown in FIGS. 2 and 3, the upper cover 140 is disk-shaped, and includes an air inlet 141 and an air outlet 142. When the cyclone type dust collector 30 is mounted in the dust chamber 11 of the cleaner body 10, the air inlet 141 and air outlet 142 of the cyclone type dust collector 30 are connected with the respective air inlet 12 and outlet of the dust chamber 11. Here, the air inlet 141 of the cyclone type dust collector 30 is formed on an edge of the upper cover 140 to guide the air in a diagonal direction with respect to the outer cyclone receptacle 160 when the air is drawn therethrough. The air outlet 142 of the cyclone type dust collector 30 is formed in a center of the upper cover 140.

The outer cyclone receptacle 160 is substantially cylindrical and has open upper and lower ends. The upper end of the cyclone receptacle 160 is joined with the upper cover 140. The outer cyclone receptacle 160 separates, using centrifugal force, the large particle contaminants from the air by inducing the air into a vortex through a cooperation of the outer cyclone receptacle 160 and the upper cover 140. Here, the vortex of air descends toward the bottom of the outer cyclone receptacle 160, where it then ascends in a reverse direction.

The inner cyclone receptacle 150 is joined with the upper cover 140 and disposed within the outer cyclone receptacle 160. The inner cyclone receptacle 150 includes a grill 151 having a plurality of fine holes 151a formed therein, and a second air inlet 152. The air that ascends from the bottom of the outer cyclone receptacle 160 passes through the fine holes 151a of the grill 151 of the inner cyclone receptacle 150, and into the second air inlet 152 and inner cyclone receptacle 150 in a diagonal direction. Accordingly, the inner cyclone receptacle 150 induces the air into a second vortex air, and minute particle dust is separated from the air by centrifugal force, and falls onto the bottom.

It is preferable that the first air inlet 141, which is formed on the upper cover 140, and the second air inlet 152, which is formed on the inner cyclone receptacle 150, partially overlap each other.

Meanwhile, the vortex of air descending in the inner cyclone receptacle 150 ascends in a reverse direction after reaching the bottom, and is discharged through the air outlet 142 of the upper cover 140. The cyclone type dust collector 30 further includes an outlet pipe 143 that extends downward by a predetermined depth from the air outlet 142. The outlet pipe 143 guides the discharged air and has a skirt 144 that extends downward from a lower end of the outlet pipe 143. The skirt 144 has a gradually increasing diameter as it extends toward the lower end of the outlet pipe 143 to prevent dust and contaminants from ascending together with the ascending vortex air. The skirt 144 also increases minute particle dust collecting efficiency by increasing the flow velocity of ambient air.

Further, a plurality of spiral grooves are formed on an outer circumference of the outlet pipe 143 to increase centrifugal force.

Due to a downwardly tapered structure of the inner cyclone receptacle 150, the diameter of which gradually decreases from a middle level to the lower end, a gap between the inner and outer cyclone receptacles 150 and 160 gradually increases, and accordingly, the air flow velocity gradually decreases, preventing a reverse flow of the contaminants that have been collected at the bottom of the outer cyclone receptacle 160.

The lower cover 170 is removably mounted on a lower opening of the outer cyclone receptacle 160, to allow disposal of contaminants therethrough. Such a lower cover 170 is preferably screwed onto the outer cyclone receptacle 160.

Meanwhile, a reverse flow prevention pipe 180 extends upward from a center of the lower cover 170 by a predetermined height to prevent more efficiently a reverse flow of minute particle dust collected in the inner cyclone receptacle 150. That is, due to the presence of the reverse flow prevention pipe 180, the air around center area of the inner cyclone receptacle 150 directly ascends. Accordingly, the movement of the dust is minimized, and a reverse flow of the minute particle dust can be also prevented. In case of a reverse flow of large particle contaminants along with the ascending vortex air, the contaminants are filtered out by the fine holes 151a of the grill 151 and fall to the bottom.

Hereinafter, operation of the main aspect of the present invention, i.e. the cyclone type dust collector of the upright type vacuum cleaner constructed as above will be described with reference to FIG. 3.

Air and dust and contaminants entrained in the air flow into the outer cyclone receptacle 160 diagonally through the first air inlet 141 of the upper cover 140, forming a vortex current of air in the outer cyclone receptacle 160. Due to the centrifugal force of the vortex of air, large particle contaminants (e.g., contaminants that are larger than the fine holes 151a of the inner cyclone receptacle 150) are separated and fall to the bottom of the outer cyclone receptacle 150.

Next, as the air reaches the bottom of the outer cyclone receptacle 150, the air and minute particle dust entrained therein ascend in a reverse direction and flow through the fine holes 151a of the grill 151 of the inner cyclone receptacle 150, the second air inlet 152, and into the inner cyclone receptacle 150 diagonally. The inner cyclone receptacle 150 generates a second vortex of air. Here, by the centrifugal force, the minute particle dust is separated from the air and falls and is collected at the bottom of the inner cyclone receptacle 150.

Here, since the flow velocity of the descending air is increased due to the presence of the skirt 144, the minute dust collecting efficiency can be improved, while the larger particle contaminants collected in the inner cyclone receptacle 150 do not reversely flow but rather remain at the bottom portion of the inner cyclone receptacle 150.

When the descending air finally reaches the bottom of the inner cyclone receptacle 150, the air ascends in a reverse direction and is discharged to the outside atmosphere through the outlet pipe 143.

As described above, according to the present invention, the dust and contaminants are separated from the air through two processes using centrifugal force, and accordingly, separating and collecting the minute particle dust and large particle contaminants can be more efficiently performed.

Later, when the cyclone receptacles 150 and 160 are filled with contaminants, a user can separate the receptacles 150 and 160 from the cleaner body 10, and dump the collected dust and contaminants by openings the lower cover 170.

Figure 4:
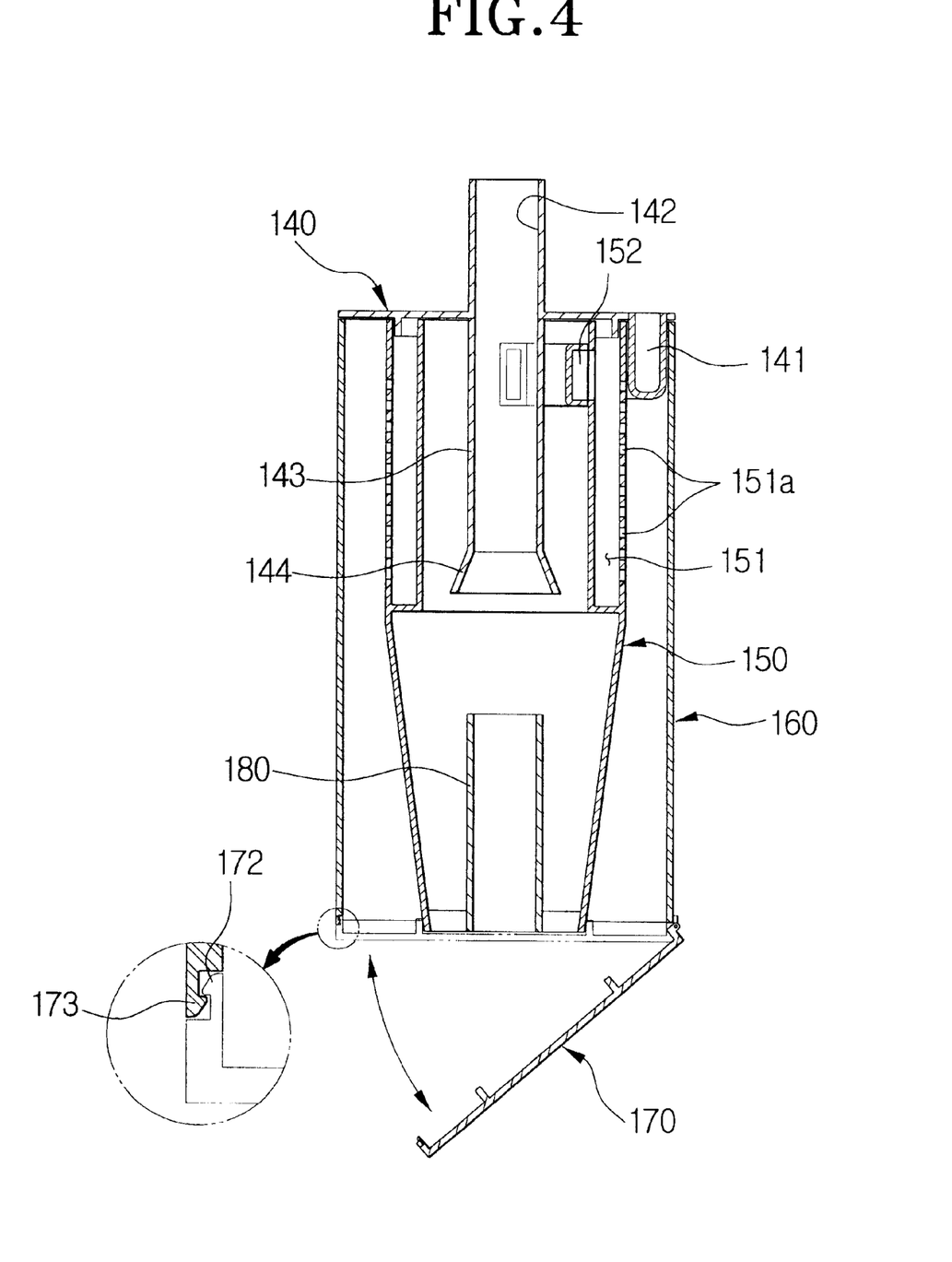
FIG. 4 is a sectional view of a cyclone type dust collector according to a second preferred embodiment of the present invention.

FIG. 4 shows a cyclone type dust collector according to a second preferred embodiment of the present invention.

Since the basic structure employed in the second embodiment is substantially the same as that of the first embodiment, further description thereof will be omitted. Like elements have the same reference numerals throughout the description and drawings. Accordingly, the main aspect of the second embodiment, i.e., a lower cover 170 will be described in greater detail below.

As shown in FIG. 4, in the cyclone type dust collector according to the second preferred embodiment, the lower cover 170 is not completely detachable from the outer cyclone receptacle 160, but hingedly connected to the outer cyclone receptacle 160.

In greater detail, an end of the lower cover 170 is connected to an end of the outer cyclone receptacle 160 by a hinge 171. Thus, the lower cover 170 can be opened and pivoted about the hinge 171. On the other end of the lower cover 170, a locker 172 is formed, while the outer cyclone receptacle 160 has a locking protrusion 173 formed thereon to selectively engage the locker 172 of the lower cover 170.

Figure 8:
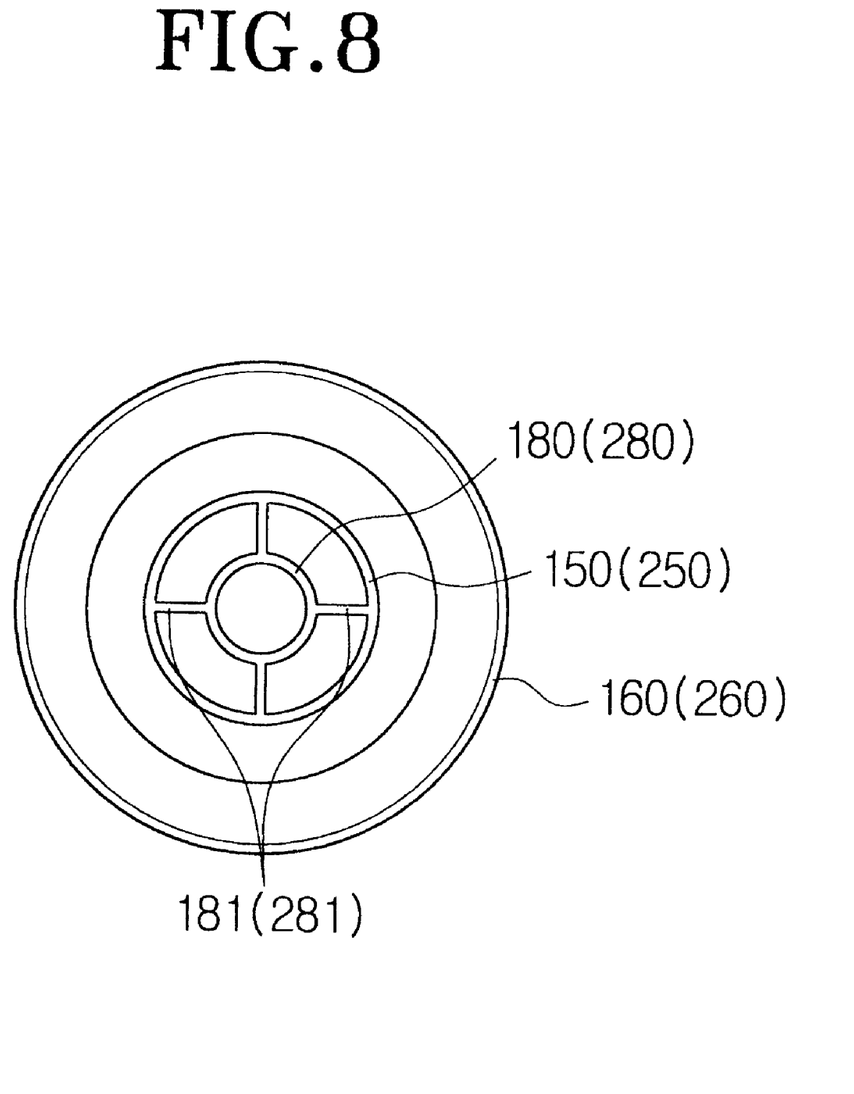
FIG. 8 is a bottom view of the cyclone type dust collector according to the present invention, illustrating a reverse flow preventing bar connected by ribs.

As described above, since the lower cover 170 pivotally opens or closes, the reverse flow prevention pipe 180, which in the previous embodiment was formed on the lower cover 170, may interfere with the inner cyclone receptacle 150, thereby hindering smooth opening or closing of the lower cover 170. Accordingly, in this embodiment, the reverse flow prevention pipe 180 is integrally supported on a plurality of ribs 181 (FIG. 8) which are formed on the lower opening of the inner cyclone receptacle 150.

Figure 5:
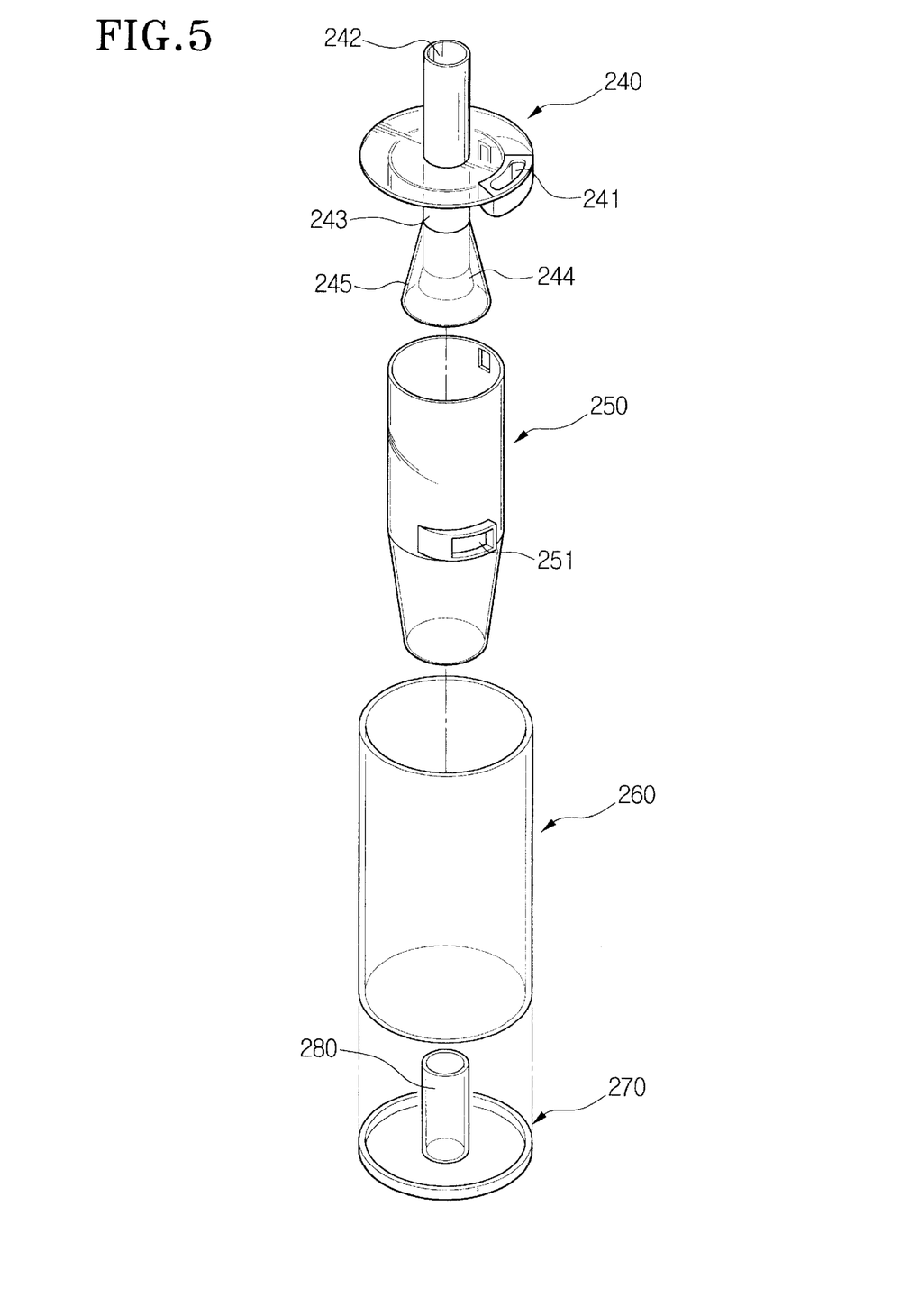
FIG. 5 is an exploded perspective view of a cyclone type dust collector according to a third preferred embodiment of the present invention.
Figure 6:
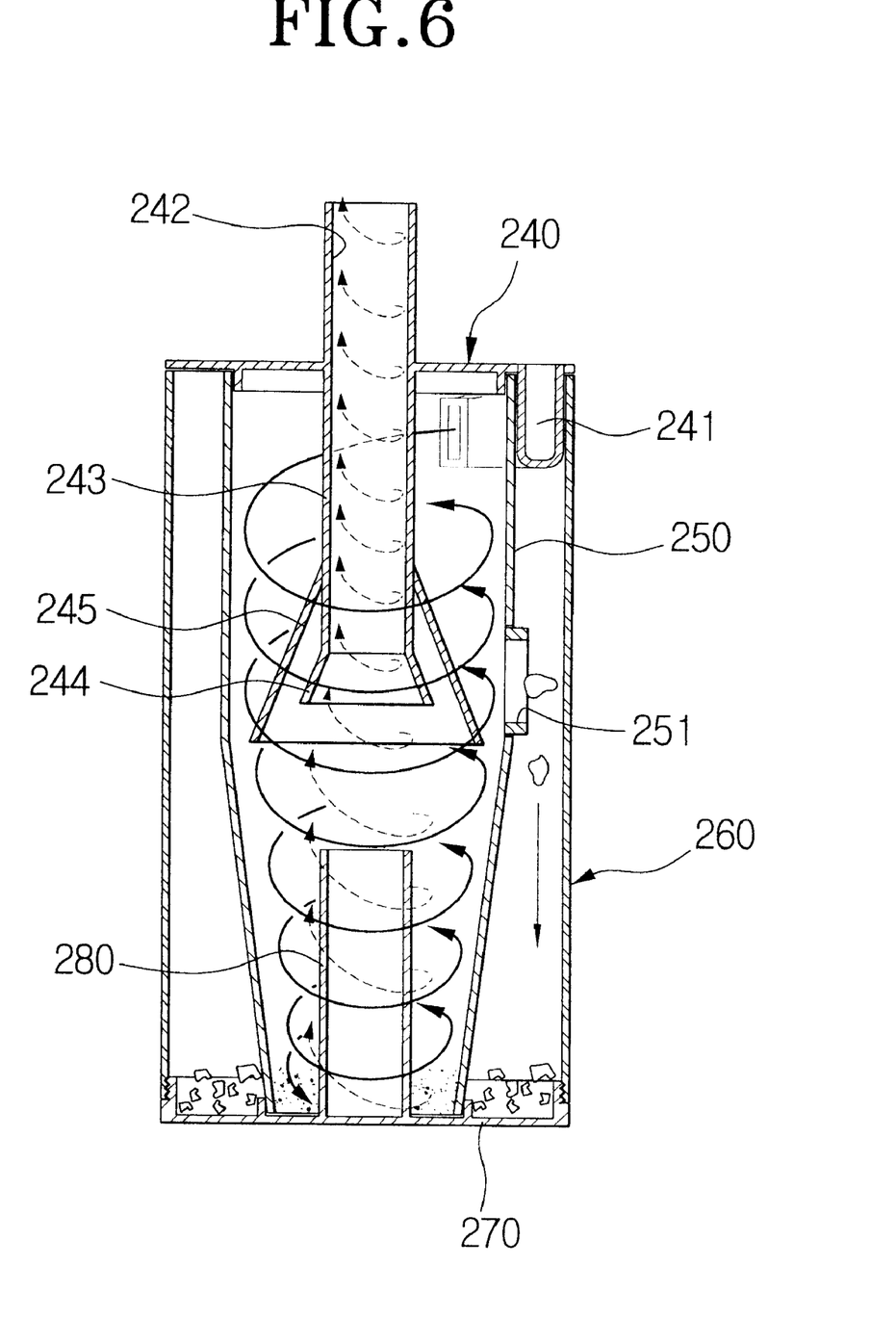
FIG. 6 is a sectional view showing the cyclone type dust collector of FIG. 5 in an assembled state.

FIGS. 5 and 6 show a cyclone type dust collector according to a third preferred embodiment of the present invention. The upper cover 240 is a circular plate and has air inlet 241 and an air outlet 242 formed therein. When the cyclone type dust collector 30 is mounted in the dust chamber 11 of the cleaner body 10, the air inlet 241 and air outlet 242 of the cyclone type dust collector 30 are respectively interconnected to the air inlet 12 and outlet (not shown) of the dust chamber 11. Here, the air inlet 241 of the cyclone type dust collector 30 is formed on an edge of the upper cover 240 to guide the air, which is drawn into the inner cyclone receptacle 250 through the air inlet 241, in a diagonal direction. The air outlet 242 of the cyclone type dust collector 30 is formed in the center of the upper cover 240.

The inner cyclone receptacle 250 is substantially cylindrical and has open upper and lower ends. An upper cover 240 is mounted on or integrally formed with the inner cyclone receptacle 250. The cooperation of the inner cyclone receptacle 250 and the upper cover 240 causes a vortex of air having a centrifugal force to separate dust and contaminants from the air. Further, the inner cyclone receptacle 250 has a contaminant outlet 251, formed in the center portion thereof, through which the large particle contaminants that have been separated by the centrifugal force may be discharged. More specifically, the centrifugal force generated by the vortex current of air in the inner cyclone receptacle 250 separates the contaminants from the air. As the contaminants fall, the large particle contaminants are discharged through the contaminant outlet 251.

An outlet pipe 243 extends downward by a predetermined depth from the air outlet 242 of the upper cover 240. The outlet pipe 243 guides the reverse-ascending air from the bottom of the inner cyclone receptacle 250 through the air outlet 242 of the upper cover 240. It is preferable that the outlet pipe 243 extends to correspond with the contaminant outlet 251 of the inner cyclone receptacle 250.

The outlet pipe 243 has a first skirt 244 that extends downward from an end of the outlet pipe 243. The first skirt 244 prevents the collected dust and contaminants from floating upward with the reverse-ascending air. The outlet pipe 243 further includes a second skirt 245 that extends downward therefrom to guide the large particle contaminants, which are discharged from the inner cyclone receptacle 250 through the contaminant outlet 251. The second skirt 245 has a gradually increasing diameter. Accordingly, not only the reverse flow of the large particle contaminant, but also the minute particle dust can be efficiently separated and collected.

The outer cyclone receptacle 260 is substantially cylindrical and has open upper and lower ends. The outer cyclone receptacle 260 is joined with the upper cover 240 to surround the inner cyclone receptacle 250 concentrically. The outer cyclone receptacle 260 collects the large particle contaminants, which have been discharged through the contaminant outlet 251 of the inner cyclone receptacle 250.

The inner cyclone receptacle 250 is downwardly tapered to have a gradually decreasing diameter. This decreasing diameter of the inner cyclone receptacle 250 works with the outer cyclone receptacle 260 to reduce flow velocity and to prevent contaminants collected in the outer cyclone receptacle 260 from ascending with the reverse-ascending vortex of air.

By opening the lower cover 270, which is removably mounted on the lower opening of the outer cyclone receptacle 260, the collected contaminants may be removed from the cyclone type dust collector. The lower cover 270 is preferably screwed onto the outer cyclone receptacle 260.

The cyclone type dust collector further includes a reverse flow prevention pipe 280 that extends upward by a predetermined height from the center of the lower cover 270. The reverse flow prevention pipe 280 prevents the reverse flow of the minute particle dust that has been collected in the inner cyclone receptacle 250 more efficiently.

Hereinafter, the cyclone type dust collector of the upright type vacuum cleaner constructed as above according to the present invention will be described with reference to FIG. 6.

Air containing dust and contaminants flow diagonally into the inner cyclone receptacle 250 through the air inlet 241 of the upper cover 240, forming a vortex of air in the inner cyclone receptacle 250. Due to the centrifugal force of the vortex of air, dust and contaminants are separated from the air, fall and are collected in the inner cyclone receptacle 250, and the large particle contaminants are discharged through the contaminant outlet 251 to the outer cyclone receptacle 260. Here, the collected minute particle dust do not float in a reverse direction due to the presence of the first skirt 244 and the reverse flow prevention pipe 280, and instead is collected in the inner cyclone receptacle 250. Also, the movement of the collected large particle contaminants in the outer cyclone receptacle 260 is restricted by the downwardly tapered structure of the inner cyclone receptacle 250 which causes a decrease in the flow velocity of the air. Accordingly, a reverse flow of the contaminants is prevented. Further, due to the presence of the second skirt 245, the large particle contaminants are discharged through the contaminant outlet 251 more efficiently.

Meanwhile, the air, which descends in a circular motion along the inner circumference of the inner cyclone receptacle 250, ascends in a reverse direction after reaching the bottom, and is discharged through the outlet pipe 243.

According to the present invention, since minute particle dust and large particle contaminants are separated from the air through two processes using centrifugal force, the dust and contaminants are separated and collected more efficiently.

Later, when the cyclone receptacles 250 and 260 are filled with contaminants, a user can separate the cyclone receptacles 250 and 260 from the cleaner body 10, open the lower cover 270 and dump the collected contaminants.

Figure 7:
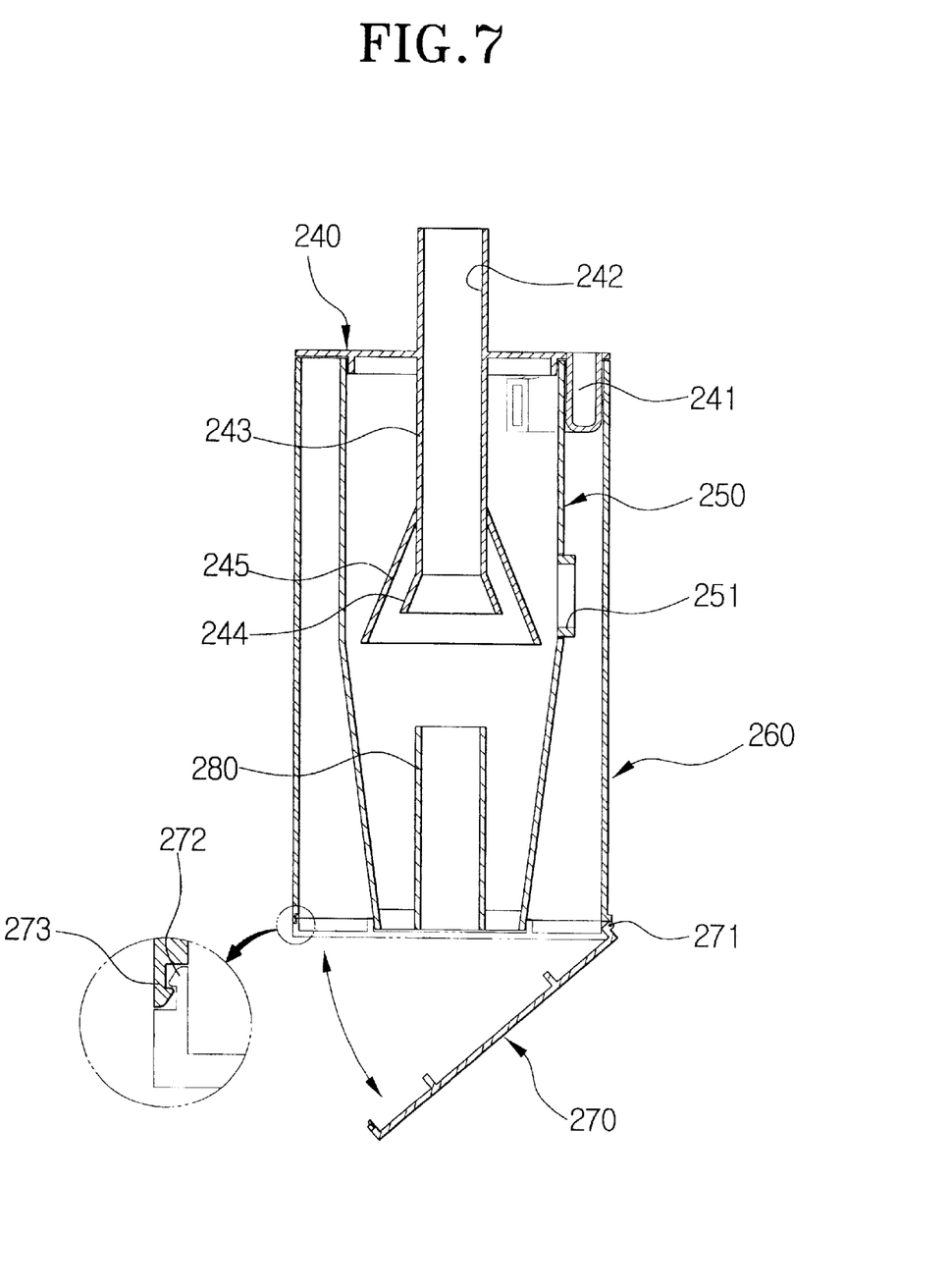
FIG. 7 is a sectional view of a cyclone type dust collector according to a fourth preferred embodiment of the present invention.

FIG. 7 shows a cyclone type dust collector according to a fourth preferred embodiment of the present invention.

The basic structure of the cyclone type dust collector employed in the fourth embodiment is substantially identical with that of the third preferred embodiment, and accordingly, descriptions about the same elements will be omitted, but the main aspect of this embodiment, i.e., the lower cover 270 will be described in greater detail.

As shown in FIG. 7, in the cyclone type dust collector according to the fourth preferred embodiment of the present invention, like in the second embodiment, the lower cover 270 is not completely separable from the outer cyclone receptacle 260, but hingedly connected to the outer cyclone receptacle 260.

In greater detail, one end of the lower cover 270 is connected to one end of the outer cyclone receptacle 260 by a hinge 271. Thus, the lower cover 270 can be opened and pivoted about the hinge 271. Further, the lower cover 270 has a locker 272 formed on the other end, while the outer cyclone receptacle 260 has a locking protrusion 273 that engages with the locker 272 to selectively lock the locker 272.

Here, since the lower cover 270 is hingedly connected to the outer cyclone receptacle 260, the reverse flow prevention pipe 280 may interfere with the outer cyclone receptacle 260 if formed on the lower cover 270 as in the third embodiment. Accordingly, in the fourth preferred embodiment, the reverse flow prevention pipe 280 is integrally supported on a plurality of ribs 281 (FIG. 8) at the lower opening of the inner cyclone receptacle 250.

As described above, according to the present invention, dust and contaminants are separated from the air much easier by using the cyclone type dust collector. That is, there is no need to employ or replace a dust filter which is expendable and unhygienic. Accordingly, the vacuum clean is more convenient for a user to use.

Further, in the cyclone type dust collector of the present invention, minute particle dust and large particle contaminants are separated from the air through two processes using centrifugal force, thereby guaranteeing a more effective cleaning process.

As stated above, preferred embodiments of the present invention are shown and described. Although the preferred embodiments of the present invention have been described, it is understood that the present invention should not be limited to the preferred embodiments. Various changes and modifications can be made by one skilled in the art within the spirit and scope of the present invention as hereinafter claimed.

What is claimed is:

1. An upright type vacuum cleaner comprising:
    a body having a dust chamber and a motor chamber formed therein;
    a suction brush connected to the cleaner body for moving along a cleaning surface; and
    a cyclone type dust collecting means removably disposed in the dust chamber of the cleaner body for separating by centrifugal force and collecting minute particle dust and large particle contaminants from air that is drawn in through the suction brash, the cyclone type dust collecting means including;
    an upper cover, having a first air inlet connected to a suction hose for connecting between the suction brush and the dust chamber, and an air outlet to an exhaust hose for connecting between the dust chamber and the motor chamber;
    a substantially cylindrical outer cyclone receptacle having open upper and lower ends, the outer cyclone receptacle being coupled to the upper cover;
    an inner cyclone receptacle coupled to the upper cover in fluid communication with and disposed within the outer cyclone receptacle, the inner cyclone receptacle being shaped and configured to create an air vortex for collecting dust and a reverse flow prevention pipe extending a predetermined height from the center of the inner cyclone receptacle to guide reverse-ascending vortex air as it ascends from the bottom of the inner cyclone receptacle thereby inhibiting reverse flow of contaminants; and a lower cover mounted on a lower opening of the outer cyclone receptacle and covering both the outer and inner cyclone receptacles, the lower cover providing access to dust and contaminants collected in die inner and outer cyclone receptacles.

2. The vacuum cleaner of claim 1, wherein the inner cyclone receptacle comprises a grill having a plurality of fine holes, and a second air inlet for guiding the air which passes through the grill into a vortex, thereby separating by centrifugal force and collecting the dust from the air.

3. The vacuum cleaner of claim 1, wherein the first air inlet of the inner cyclone receptacle guides the air containing dust and contaminants into a vortex, the centrifugal force of the vortex separating the contaminants from the vortex, the inner cyclone receptacle having a contaminant outlet through which the separated contaminants are discharged into the outer cyclone receptacle.

4. The vacuum cleaner of claim 2, wherein the first and second air inlets of the upper cover partially overlap each other.

5. The vacuum cleaner of claim 2, wherein the upper cover comprises an outlet pipe, the outlet pipe extending downward from the air outlet and having a skirt, the skirt extending downward from an end of the outlet pipe and having a gradually increasing diameter, the skirt improving a dust collecting efficiency by increasing an air flow velocity.

6. The vacuum cleaner of claim 5, wherein the outlet pipe has a spiral groove for increasing a centrifugal force.

7. The vacuum cleaner of any of claims 1 or 3, wherein the inner cyclone receptacle taper downwardly from a middle level thereof to form a gradually increasing gap between the surfaces defining the inner and outer cyclone receptacles, the gradually increasing gap decreasing flow velocity of the air vortex in the inner cyclone receptacle and preventing reverse flow of contaminants collected in the outer inner cyclone receptacle from returning to the inner cyclone receptacle.

8. The vacuum cleaner of any of claim 1 to 3, wherein the lower cover is removably screwed to a lower opening of the outer cyclone receptacle.

9. The vacuum cleaner of claim 8, wherein the reverse flow prevention pipe is integrally formed on the center of the lower cover.

10. The vacuum cleaner of any of claims 1 or 3, wherein a first side of the lower cover is hingedly connected to a lower end of the outer cyclone receptacle, and wherein a second side of the lower cover has a lock formed thereon, the lock engaging with a locking protrusion formed on the outer cyclone receptacle, the hingedly connected lower cover allowing disposal of contaminants collected in the inner and outer cyclone receptacles.

11. The vacuum cleaner of claim 1, wherein the reverse flow prevention pipe is integrally formed on a lower opening of the inner cyclone receptacle by a plurality of ribs.

12. An upright type vacuum cleaner comprising:
a body having a dust chamber and a motor chamber formed therein;
a suction brush connected to the cleaner body for moving along a cleaning surface; and
a cyclone type dust collecting means removably disposed in the dust chamber of the cleaner body for separating by centrifugal force and collecting minute particle dust and large panicle contaminants from air that is drawn in through the suction brush, the cyclone type dust collecting means including:
an upper cover, having a first air inlet connected to a suction hose for connecting between the suction brash and the dust chamber, and an air outlet to an exhaust hose for connecting between the dust chamber and the motor chamber, the upper cover further comprising an outlet pipe extending downwardly from the air outlet and having a first skirt extending downwardly from an end of the outlet pipe, the first skirt having a gradually divergent surface with increasing diameter in the direction away from the outlet pipe end, the first skirt inhibiting reverse flow of contaminants collected in the inner cyclone receptacle from entry into the outlet;
a substantially cylindrical outer cyclone receptacle having open upper and lower ends, the outer cyclone receptacle being coupled to the upper cover;
an inner cyclone receptacle coupled to the upper cover in fluid communication with and disposed within the outer cyclone receptacle, the inner cyclone receptacle being shaped and configured to create an air vortex for collecting dust; and
a lower cover mounted on a lower opening of the outer cyclone receptacle and covering both the outer and inner cyclone receptacles, the lower cover providing access to dust and contaminants collected in the inner and outer cyclone receptacles.

13. The vacuum cleaner of claim 12, wherein the outlet pipe comprises a second skirt extending downwardly from a middle level of the outlet pipe, the second skirt having a divergent surface, with a gradually increasing diameter in the downward direction, to guide contaminants entrained in the air in the inner cyclone receptacle to be discharged through the contaminant outlet.

* * * * *